United States Patent
Jung et al.

(10) Patent No.: US 7,628,375 B2
(45) Date of Patent: Dec. 8, 2009

(54) SWIVELING APPARATUS FOR A MONITOR APPARATUS

(75) Inventors: Hyun-jun Jung, Suwon-si (KR); Kyung-kyun Lee, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 186 days.

(21) Appl. No.: 11/433,506

(22) Filed: May 15, 2006

(65) Prior Publication Data

US 2007/0001084 A1    Jan. 4, 2007

(30) Foreign Application Priority Data

Jun. 13, 2005    (KR) .................. 10-2005-0050356

(51) Int. Cl.
*G06F 1/16* (2006.01)

(52) U.S. Cl. ............... 248/676; 248/122.1; 248/176.3; 248/919; 361/679.06

(58) Field of Classification Search ............ 248/676, 248/122.1, 176.3, 919; 361/679.02, 679.06
See application file for complete search history.

(56) References Cited

U.S. PATENT DOCUMENTS

| | | | | |
|---|---|---|---|---|
| 3,653,340 A | * | 4/1972 | Bugg .................. | 108/139 |
| 4,591,123 A | * | 5/1986 | Bradshaw et al. ..... | 248/179.1 |
| 4,901,973 A | * | 2/1990 | Ferrara, Jr. .......... | 248/349.1 |
| 4,919,383 A | * | 4/1990 | Benjamin et al. ...... | 248/349.1 |
| 4,946,127 A | * | 8/1990 | Kulaga ................ | 248/551 |
| 5,564,669 A | * | 10/1996 | Wu ..................... | 248/346.01 |
| 5,632,463 A | * | 5/1997 | Sung et al. ........... | 248/371 |
| 5,895,022 A | * | 4/1999 | Kim .................... | 248/398 |
| 6,789,976 B2 | * | 9/2004 | Hung et al. ........... | 403/84 |

FOREIGN PATENT DOCUMENTS

| | | |
|---|---|---|
| JP | 2001-309279 | 11/2001 |
| JP | 2003-298979 | 10/2003 |
| JP | 2004-274384 | 9/2004 |
| KR | 1998-014045 | 6/1998 |
| KR | 2000-0001613 | 1/2000 |
| KR | 2000-0005540 | 3/2000 |

* cited by examiner

*Primary Examiner*—Korie Chan
(74) *Attorney, Agent, or Firm*—Roylance, Abrams, Berdo & Goodman, L.L.P.

(57) ABSTRACT

A monitor apparatus which includes a monitor body displaying an image thereon and a base member supporting the monitor body includes a fixed swivel member and a movable swivel member. The fixed swivel member is coupled to the base member. One side of the movable swivel member is coupled to the monitor body and the other side of the movable swivel member is coupled to the fixed swivel member so as to swivel around a swivel shaft. A projection member is coupled to one of the fixed and movable swivel members and protrudes to the other of the fixed and movable swivel members. A latching portion is formed at the other of the fixed swivel member and the movable swivel member so as to engage the projection member. With this structure, the monitor apparatus can be easily swiveled and stopped at a desired angle.

6 Claims, 4 Drawing Sheets

SWIVELING APPARATUS FOR A MONITOR APPARATUS

CROSS-REFERENCE TO RELATED APPLICATIONS

This application claims the benefit under 35 U.S.C. § 119(a) of Korean Patent Application No. 2005-0050356, filed on Jun. 13, 2005, the entire contents of which are hereby incorporated by reference.

BACKGROUND OF THE INVENTION

1. Field of the Invention

The present invention relates to a monitor apparatus. More particularly, the present invention relates to a monitor apparatus that has a monitor body with a swiveling structure.

2. Description of the Related Art

Home appliances such as TVs, computers and the like are provided with a monitor apparatus. The monitor apparatus comprises a monitor body that displays an image and a base member that supports the monitor body for installation on the surface of a desk or the like. Except for large monitor apparatuses, the monitor body can be generally swiveled right and left and forward and backward.

Furthermore, if necessary, the monitor body may be swiveled around an axial line in a transverse direction of a surface of the base member. This type of monitor body is disclosed in Korean Patent Application Publication No. 2003-77383, published on Dec. 1, 2003, which is hereby incorporated by reference in its entirety. In the disclosed structure, a swivel plate is provided between an upper plate and a lower plate of the base member to swivel the monitor body. The monitor body can be swiveled by sliding the swivel plate on a connecting portion through surface contact between their surfaces.

Since the monitor apparatus is swiveled through surface contact, when the monitor body and the connecting portion are relatively heavy, it is necessary to apply a large external force. Thus, it is inconvenient to use. In addition, the monitor body is held at a desired angle through the friction of the surface contact, and is not positively maintained at a desired angle. Consequently, the monitor body may be undesirably swiveled by a small external force or a weight imbalance.

Accordingly, there is a need for a monitor apparatus with an improved structure for swiveling the monitor body.

BRIEF SUMMARY OF THE INVENTION

An aspect of the present invention is to address at least the above problems and/or disadvantages and to provide at least the advantages described below. Accordingly, an aspect of the present invention is to provide a monitor apparatus which can be easily swiveled and maintained in a stopped state at a desired angle.

In accordance with an aspect of the present invention, a monitor apparatus includes a monitor body displaying an image thereon and a base member supporting the monitor body. A fixed swivel member is coupled to the base member. One side of a movable swivel member is coupled to the monitor body, and the other side of the movable swivel member is coupled to the fixed swivel member so as to be swiveled around a swivel shaft. A projection member is coupled to one of the fixed and movable swivel members and protrudes to the other of the fixed and movable swivel members. A latching portion is formed at the other of the fixed swivel member and the movable swivel member so as to engage the projection member.

According to an exemplary embodiment of the present invention, a plurality of projection members is provided, and one or more latching portions are provided.

According to an exemplary embodiment of the present invention, the projection member comprises a roller, and the latching portion has a recessed shape corresponding to the roller.

According to an exemplary embodiment of the present invention, the projection member comprises a spring for elastically biasing the roller to the latching portion.

According to an exemplary embodiment of the present invention, the projection member is formed at the fixed swivel member, and the latching portion is formed at the movable swivel member.

According to an exemplary embodiment of the present invention, a plurality of latching portions are provided and are spaced apart from each other at desired angles.

According to an exemplary embodiment of the present invention, the swivel shaft connects the fixed and movable swivel members.

According to an exemplary embodiment of the present invention, the monitor further comprises a washer through which the swivel shaft passes and which is disposed between the fixed and movable swivel members so as to generate frictional force during a swiveling operation.

According to an exemplary embodiment of the present invention, the monitor further comprises an angle restricting unit for restricting a swivel angle of the movable swivel member with respect to the fixed swivel member.

According to an exemplary embodiment of the present invention, the angle restricting unit comprises a protruding part that protrudes from one of the fixed swivel member and the movable swivel member, and a projection guide part formed at the other of the fixed swivel member and the movable swivel member so as to guide the protruding part and restrict the swivel angle.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the exemplary embodiments of the invention. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

Hereinafter, a computer monitor apparatus according to an exemplary embodiment of the present invention will be described in detail with reference to the accompanying drawings.

Figure 1:
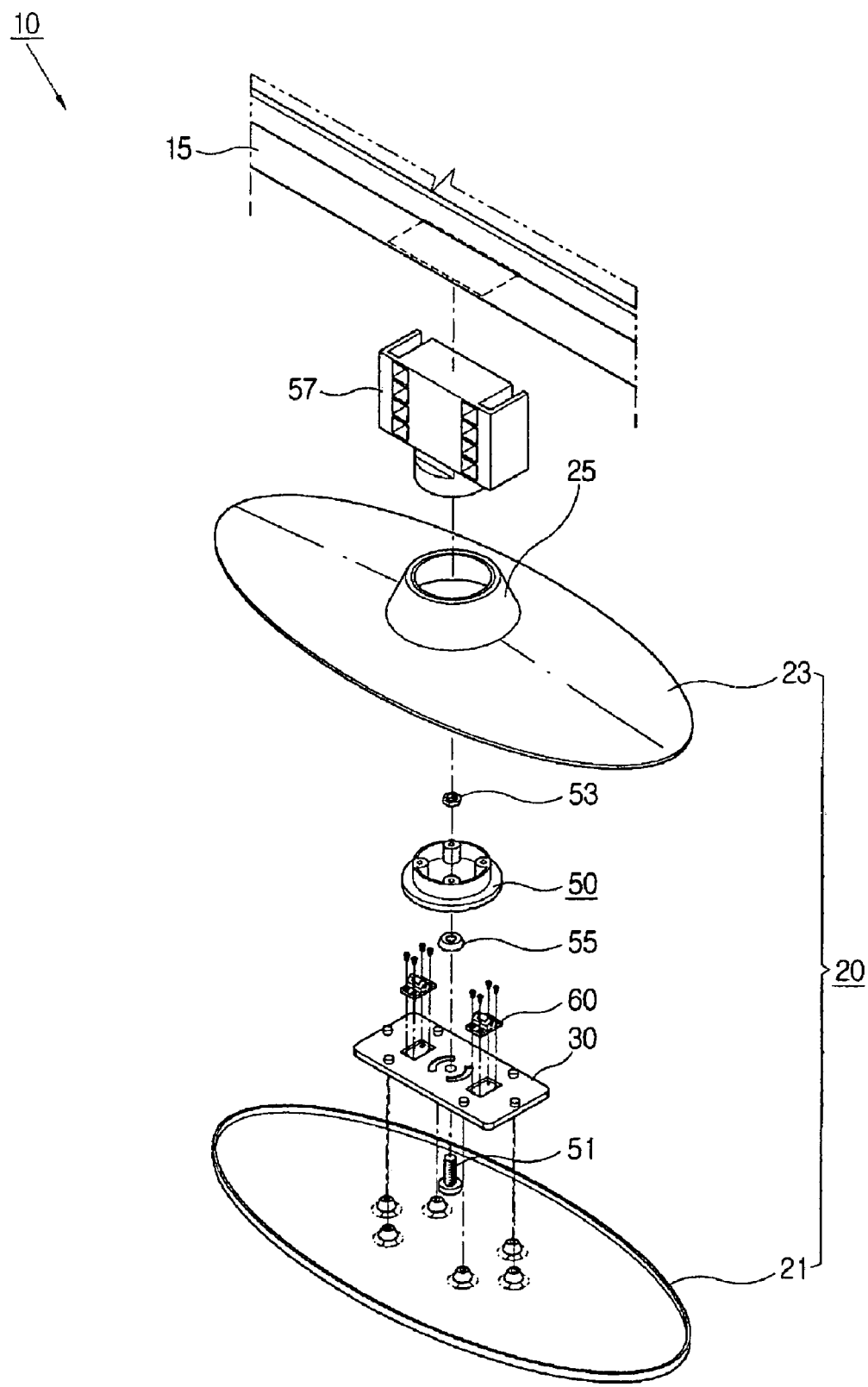
FIG. 1 is an exploded perspective view of a monitor apparatus according to an exemplary embodiment of the present invention.
Figure 2:
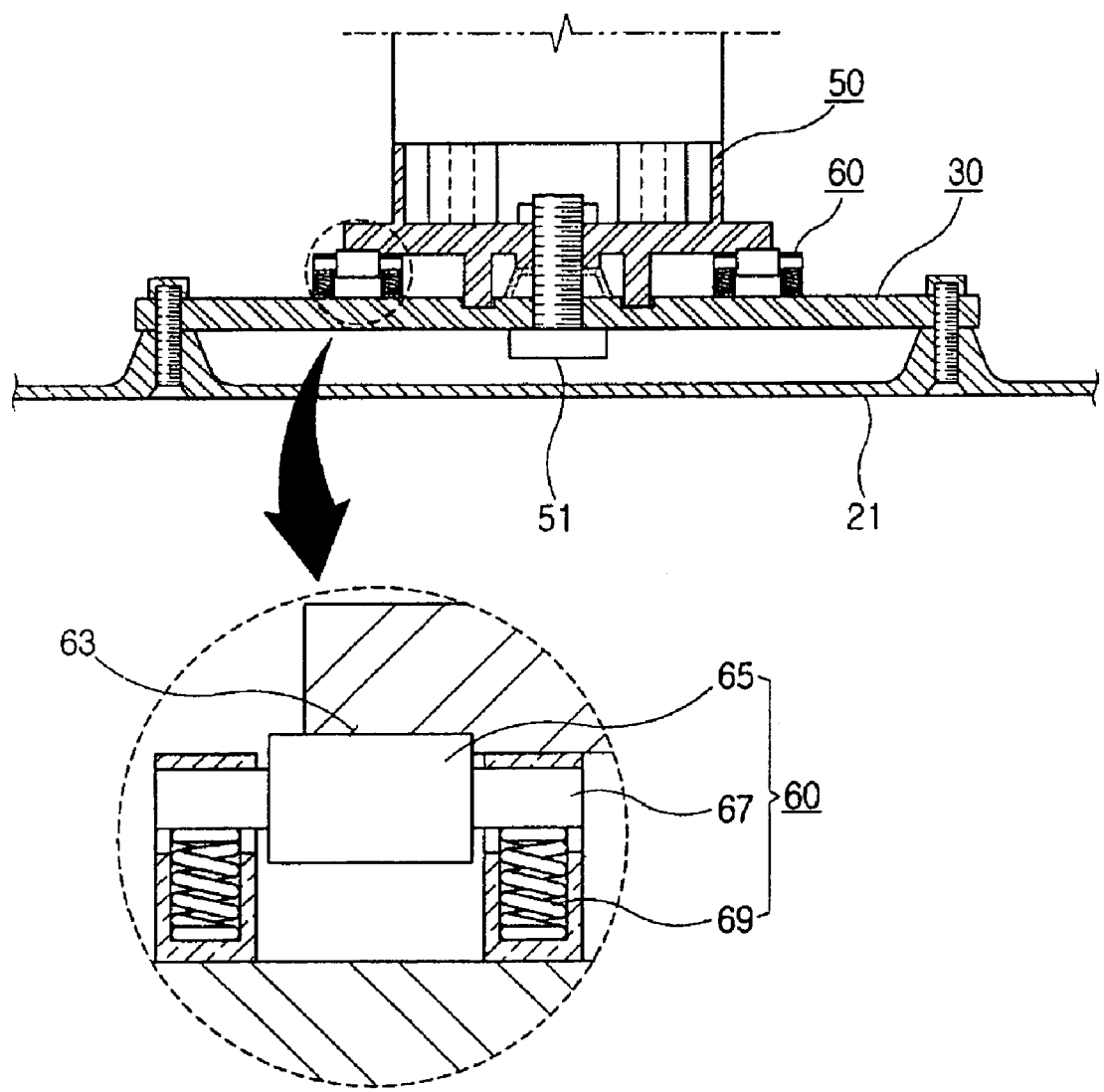
FIG. 2 is a cross-sectional view of a swivel member according to an exemplary embodiment of the present invention.

As shown in FIGS. 1 and 2, a monitor apparatus 10 of the present invention comprises a monitor body 15 displaying an image thereon, a base member 20 supporting the monitor body 15, a fixed swivel member 30 coupled to the base member 20, a movable swivel member 50 one side of which is coupled to the monitor body 15 and the other side of which is coupled to the fixed swivel member 30 so as to be swiveled relative to a desired swivel shaft 51, a projection member 60 coupled to one of the fixed swivel member 30 and the movable swivel member 50 so as to protrude toward the other one of the fixed swivel member 30 and the movable swivel member 50, and a latching portion 63 formed at the other one of the fixed swivel member 30 and the movable swivel member 50 so as to engage the projection member 60. The monitor apparatus 10 further comprises an angle restricting unit 70 so as to restrict the angular range of swiveling (see FIG. 4).

The monitor body 15 comprises a CRT monitor, an LCD monitor, or the like, which is used in a TV, a computer, or similar applications.

As shown in FIG. 1, the base member 20 comprises a lower base 21 and an upper base 23. The lower base supports the monitor body 15 and is disposed on an installation surface of a desk, a table, or the like. The upper base 23 is disposed at an upper part of the lower base 21 to be apart from the lower base 21 and coupled with the lower base 21. The base member 20 is coupled to a cover member 25 for covering the movable swivel member 50.

The lower base 21 is, in the exemplary embodiment, a relatively flat plate, and the fixed swivel member 30 is fixedly disposed on the lower base 21. Through holes (not shown) are formed in a lower area of the lower base 21 to allow screws or the like to pass through and fasten the lower base 21 via the fixed swivel member 30 to the upper base 23.

The cover member 25 is coupled to an upper surface of the upper base 23. The movable swivel member 50 is inserted into a center portion of the upper base 23, and the cover member 25 covers the inserted movable swivel member 50. The upper base 23 is fixed to the lower base 21 by screws or the like.

As shown in FIGS. 1 and 2, one side of the fixed swivel member 30 is coupled to the lower base 21, and the other side is coupled to the movable swivel member 50. The swivel shaft 51 is inserted into a center portion of the fixed swivel member 30. The movable swivel member 50 is swiveled in contact with the fixed swivel member 30. The fixed swivel member 30 is formed with a projection guide part 73 for restricting a swivel angle of the movable swivel member 50.

Figure 3:
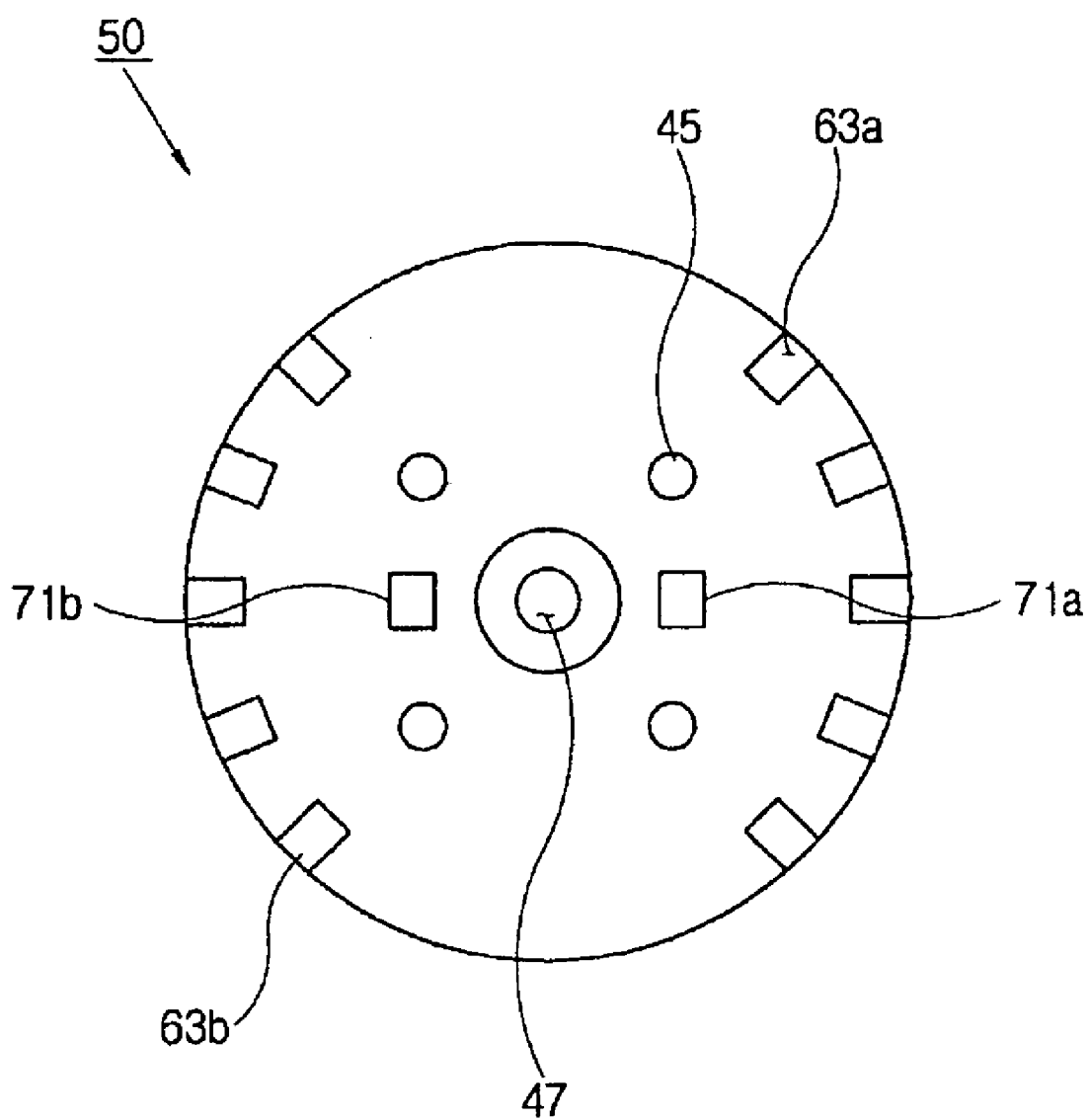
FIG. 3 is a rear view of a movable swivel member according to an exemplary embodiment of the present invention.

As shown in FIGS. 1 to 3, one side of the movable swivel member 50 is coupled to the monitor body 15, and the other side is coupled to the fixed swivel member 30, so that the movable swivel member 50 is swiveled around the swivel shaft 51. A body connecting part 57 may be further provided between the movable swivel member 50 and the monitor body 15. The movable swivel member 50 is provided with latching parts 63a, 63b by which the movable swivel member 50 is maintained at a desired angle with respect to the fixed swivel member 30, and protruding parts 71a, 71b by which the swivel angle of the movable swivel member 50 with respect to the fixed swivel member 30 is restricted. The movable swivel member 50 is formed with a movable hinge shaft hole 47 at a center portion thereof. The swivel shaft 51 is inserted into the movable hinge shaft hole 47 and coupled to the fixed swivel member 30. The movable swivel member 50 is formed with a plurality of coupling holes 45 in which screws or the like are inserted so as to be coupled to the body connecting part 57

As shown in FIGS. 1 and 2, the swivel shaft 51 combines the fixed and movable swivel members 30 and 50. The swivel shaft 51 is threaded at a side thereof, and a hinge nut 53 is screwed thereto. The swivel shaft 51 serves as a central shaft around which the movable swivel member 50 is swiveled with respect to the fixed swivel member 30.

The hinge nut 53 is screwed to a threaded portion of the swivel shaft 51. The hinge nut 53 may be fixed to the movable hinge shaft hole 47 of the movable swivel member 50 by a welding operation or the like.

A washer 55 is mounted to the swivel shaft 51 so as to be interposed between the fixed swivel member 30 and the movable swivel member 50, thereby generating a desired frictional force when swiveling the monitor body 15. Alternatively, the washer 55 may be interposed between the hinge nut 53 and the movable swivel member 50 or between a screw head of the swivel shaft 51 and the fixed swivel member 30, thereby generating the desired frictional force. In addition to a leaf spring type washer, various kinds of well-known washers 55 may be selectively employed so as to generate the desired frictional force when swiveling the monitor body 15.

One side of the body connecting part 57 is coupled to the monitor body 15, and the other side is coupled to the movable swivel member 50. The body connecting part 57 may employ a structure having a tilting function of swiveling around an axial line in a left and right direction or a pivoting function of swiveling around an axial line in front and back direction as well as a vertically upright structure in a transverse direction of a surface of the base member 20.

As shown in FIG. 2, the projection member 60 is coupled to the movable swivel member 50 as well as the fixed swivel member 30. The projection member 60 includes a projection member main body (not shown) coupled to the fixed swivel member 30, a roller 65 disposed at the projection member main body so as to protrude and contact the fixed swivel member 30, and a spring 69 elastically biasing the roller 65 toward the latching portion 63, as will be described in further detail below. In this exemplary embodiment, the projection member 60 is provided with the roller 65 so as to swivel in contact with the movable swivel member 50. However, the projection member 60 may also have various other suitable shapes.

As shown in FIGS. 2 and 3, the latching portion 63 has a recessed shape which is coupled to the movable swivel member 50 and which is also engaged with the roller 65. Therefore, the movable swivel member 50 can be maintained at a desired angle upon a swiveling operation.

According to the exemplary embodiment of the present invention, when the movable swivel member 50 is swiveled relative to the fixed swivel member 30, the roller 65 rolls in contact with only a small surface area of the fixed swivel member 30. Thus, a user can swivel the movable swivel member 50 with relatively small external force.

The spring 69 is disposed at a lower side of a roller shaft 67 so as to bias the roller shaft 67 toward the latching portion 63 so that the roller 65 engages the latching portion 63.

The roller 65 and the latching portion 63 used in this exemplary embodiment are only an example. Various other kinds of well-known elements for maintaining the movable swivel member 50 at a desired angle can be also applied.

Multiple, preferably, two, projection members 60 are provided, and the number of projection members 60 can be properly selected in accordance with load of the monitor body and other factors. As a result, at least one or more latching portions 63 corresponding to the projection members 60 are provided and spaced apart from each other at desired angles.

Figure 4:
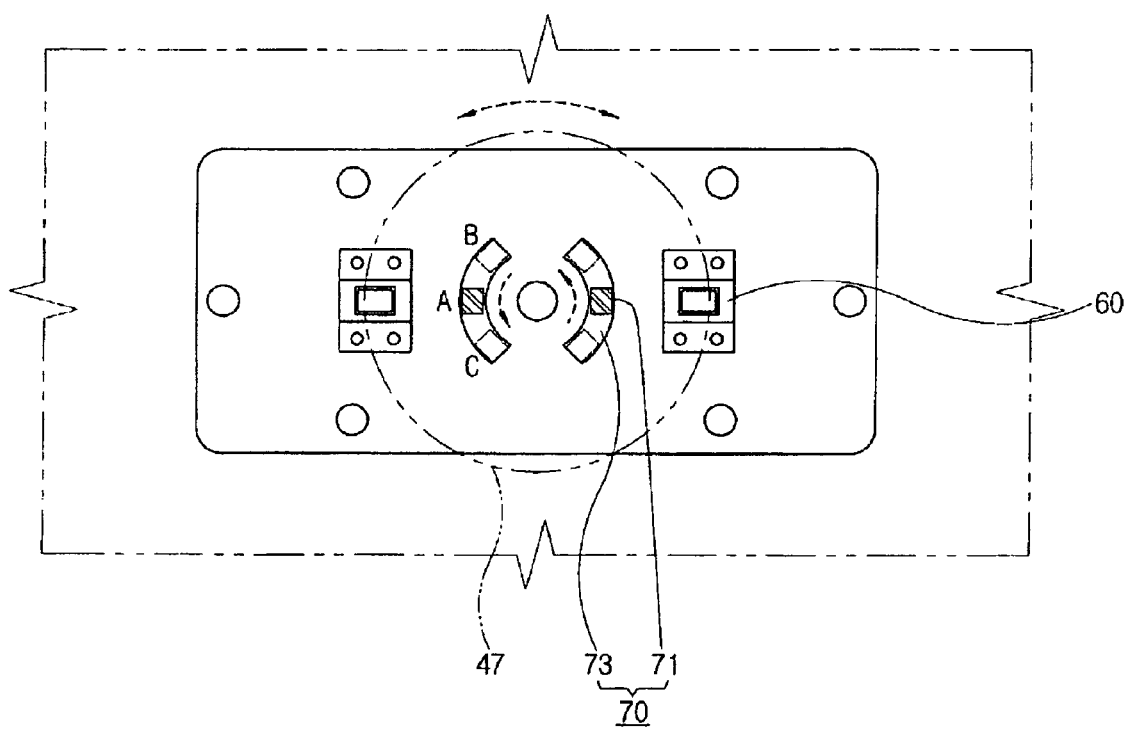
FIG. 4 is a view showing an angle restricting unit according to an exemplary embodiment of the present invention.

As shown in FIGS. 2 and 4, the angle restricting unit 70 includes a protruding part 71 that protrudes from one of the fixed swivel member 30 and the movable swivel member 50, and a projection guide part 73 that is formed at the other of the fixed swivel member 30 and the movable swivel member 50 so as to guide the protruding part 71 and restrict the swivel angle. The angle restricting unit 70 restricts a swivel angle of the movable swivel member 50 with respect to the fixed swivel member 30.

As shown in FIGS. 3 and 4, the protruding part 71 is formed at the movable swivel member 50 so as to be stopped by the projection guide part 73, whereby swivel motion of the movable is restricted (referring to the positions "A" and "B" of FIG. 4).

As shown in FIG. 4, the projection guide part 73 is recessed in the form of an arc around the swivel shaft 51 so as to guide the protruding part 71, thereby restricting the swivel angle of the movable swivel member 40. The ends of the projection guide part 73 determine a swivel angular range. The angular range of the projection guide part 73 may be about 0°~90° or about 180°, and may be any other desired angular range.

At least one or more protruding parts 71 and projection guide parts 73 are respectively provided. Preferably, the protruding parts 71 and the projection guide parts 73 are respectively provided in pairs.

Referring to FIGS. 2 to 4, the assembly and operation of the monitor apparatus according to the present invention will now be described.

Initially, the fixed swivel member 30 is fixed to the body connecting part 57 by the screws and the like passing through the coupling holes 47. At this time, the hinge nut 53 may be mounted to the movable hinge shaft hole 47 of the fixed swivel member 30 by a welding operation or the like. The fixed swivel member 30 is inserted into the center portion of the upper base 23 and the cover member 25 is mounted on the upper base 23 so as to cover the fixed swivel member 30. The washer 55 is interposed between the fixed and movable swivel members 30 and 50, and the projection guide part 73 of the fixed swivel member 30 is disposed to correspond to the protruding part 71. The swivel shaft 51 is passed through, in turn, the fixed swivel member 30, the washer 55 and the movable hinge shaft hole 47, and coupled to the hinge nut 53 with a proper torque so as to generate the desired frictional force. The lower base 21 is coupled to the fixed swivel member 30 and the upper base 23 by screws or the like. The monitor body 15 is coupled to the body connecting part 57.

Then, if the monitor body 15 is swiveled in one direction around the axial line in the transverse direction with respect to the surface of the base member 20 supported on the installation surface of a desk, a table, or the like, the movable swivel member 50 swivels around the swivel shaft 51, and then the projection member 60 engages the latching portion 63 at the desired angle, thereby maintaining a stopped state (referring to an enlarged view of FIG. 2). In this situation, if the user applies an external force to the monitor body 15, the stopped state is released and the monitor body 15 is further swiveled. When the monitor body 15 is further swiveled, the projection member 60 engages the next latching portion 63, thereby maintaining the stopped state again. This operation is continuously repeated until the swivel angle is restricted by a first end of the projection guide part 73 (referring to the position "A" of FIG. 4).

If the monitor body 15 is swiveled in an opposite direction, the above operation is repeated. This operation is also continuously repeated until the swivel angle is restricted by a second end of the projection guide part 73 (referring to the position "C" of FIG. 4).

Therefore, according to exemplary embodiments of the present invention, the monitor apparatus can be stopped and maintained at a desired angle. Further, the monitor apparatus can be easily swiveled by a relatively small external force and the swiveling operation can be restricted to a desired angular range. Thus, the present invention provides a monitor apparatus which can be easily swiveled and also maintained at a desired angle.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A monitor apparatus which includes a monitor body displaying an image thereon and a base member supporting the monitor body, comprising:
   a fixed swivel member coupled to the base member;
   a movable swivel member one side of which is coupled to the monitor body and the other side of which is coupled to the fixed swivel member so as to be swiveled around a swivel shaft;
   a projection member coupled to one of the fixed and movable swivel members, the projection member protruding to the other of the fixed and movable swivel members; and
   a plurality of latching portions formed at the other of the fixed swivel member and the movable swivel member to engage the projection member, the plurality of latching portions being spaced apart from each other at desired angles
   wherein the projection member comprises a roller and a spring disposed in the projection member elastically biasing the roller to the latching portion; and
   the latching portion has a recessed shape corresponding to the roller.

2. The monitor apparatus according to claim 1 wherein the projection member comprises a plurality of projection members.

3. The monitor apparatus according to claim 1 wherein the projection member is formed at the fixed swivel member, and the plurality of latching portions is formed at the movable swivel member.

4. The monitor apparatus according to claim 1, wherein the swivel shaft connects the fixed and movable swivel members.

5. The monitor apparatus according to claim 1, wherein:
   the roller is disposed on a roller shaft; and
   the spring biases the roller shaft toward the remaining one of the fixed swivel member and the movable swivel member.

6. A monitor apparatus which includes a monitor body displaying an image thereon and a base member supporting the monitor body, comprising:
   a fixed swivel member coupled to the base member;
   a movable swivel member one side of which is coupled to the monitor body and the other side of which is coupled to the fixed swivel member so as to be swiveled around a swivel shaft;

a projection member coupled to one of the fixed and movable swivel members, the projection member protruding to the other of the fixed and movable swivel members;

a plurality of latching portions formed at the other of the fixed swivel member and the movable swivel member to engage the projection member, the plurality of latching portions being spaced apart from each other at desired angles; and a washer through which the swivel shaft is passed and which is disposed between the fixed and movable swivel members so as to generate frictional force upon a swiveling operation.

* * * * *